(12) United States Patent
Watson et al.

(10) Patent No.: US 10,479,557 B2
(45) Date of Patent: Nov. 19, 2019

(54) SERVICABLE DRAW AND RETURN TUBE ASSEMBLY

(71) Applicants: Ken Watson, Vancouver, WA (US);
Evan Waymire, Oregon City, OR (US);
John Loffink, Damascus, OR (US)

(72) Inventors: Ken Watson, Vancouver, WA (US);
Evan Waymire, Oregon City, OR (US);
John Loffink, Damascus, OR (US)

( * ) Notice: Subject to any disclaimer, the term of this patent is extended or adjusted under 35 U.S.C. 154(b) by 0 days.

(21) Appl. No.: 15/877,055

(22) Filed: Jan. 22, 2018

(65) Prior Publication Data

US 2018/0170619 A1 Jun. 21, 2018

Related U.S. Application Data

(62) Division of application No. 14/059,042, filed on Oct. 21, 2013, now Pat. No. 9,914,558.

(60) Provisional application No. 61/718,006, filed on Oct. 24, 2012.

(51) Int. Cl.
| | | |
|---|---|---|
| *B60K 15/077* | (2006.01) | |
| *B65D 25/10* | (2006.01) | |
| *B60K 15/01* | (2006.01) | |
| *B60K 15/03* | (2006.01) | |

(52) U.S. Cl.
CPC .............. *B65D 25/10* (2013.01); *B60K 15/01* (2013.01); *B60K 15/03* (2013.01); *B60K 2015/03118* (2013.01); *B60K 2015/03125* (2013.01); *B60K 2015/03453* (2013.01)

(58) Field of Classification Search
CPC ........ B65D 25/10; B60K 15/01; B60K 15/03; B60K 2015/03118; B60K 2015/03125; B60K 2015/03453
USPC ........ 137/197, 587, 588, 589; 141/383, 386, 141/302; 220/601, 3.8, 4.12, 4.13
See application file for complete search history.

(56) References Cited

U.S. PATENT DOCUMENTS

| | | | | |
|---|---|---|---|---|
| 6,533,288 B1 * | 3/2003 | Brandner | ............... | B60K 15/03 220/304 |
| 7,341,047 B2 * | 3/2008 | Sone | .................... | F02M 37/103 123/495 |
| 2004/0200846 A1 * | 10/2004 | Miyajima | ............ | B60K 15/035 220/562 |
| 2009/0256317 A1 * | 10/2009 | Mellander | .............. | B60K 15/03 277/642 |

FOREIGN PATENT DOCUMENTS

WO WO2011159752 * 12/2011 ............ B60K 15/03

* cited by examiner

*Primary Examiner* — Andrew T Kirsch
*Assistant Examiner* — Elizabeth J Volz
(74) *Attorney, Agent, or Firm* — Ingrid McTaggart

(57) ABSTRACT

A servicable draw and return tube assembly for use in fuel tanks is disclosed. The assembly may include a draw tube and a return tube secured to a plate, wherein the plate may be removably secured to a flange, which is fixedly secured to a fuel tank. The process of removably securing the plate to the flange allows for use of different sizes and materials to be utilized in manufacture of the assembly, thereby saving installation time and manufacturing costs.

8 Claims, 3 Drawing Sheets

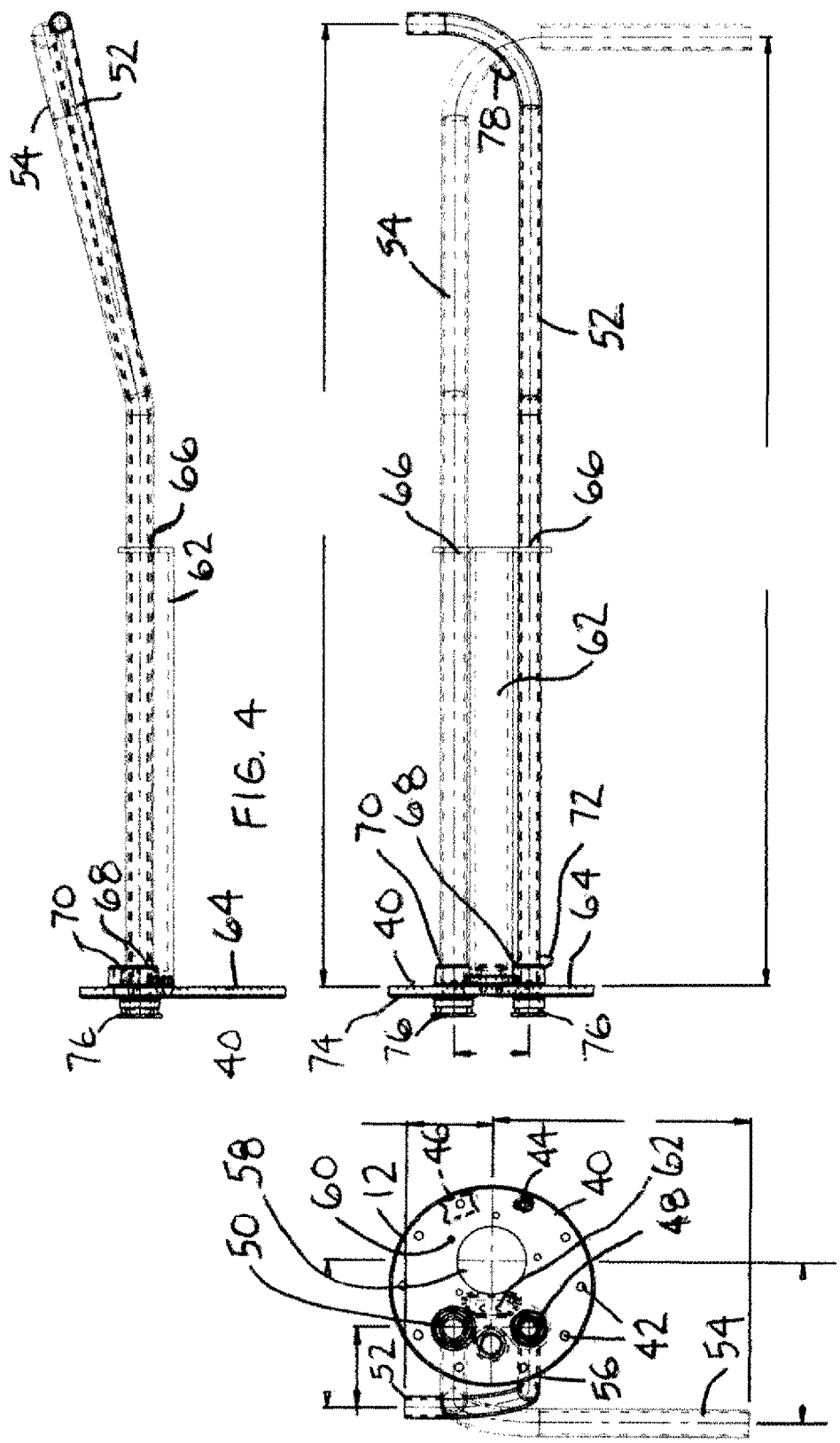

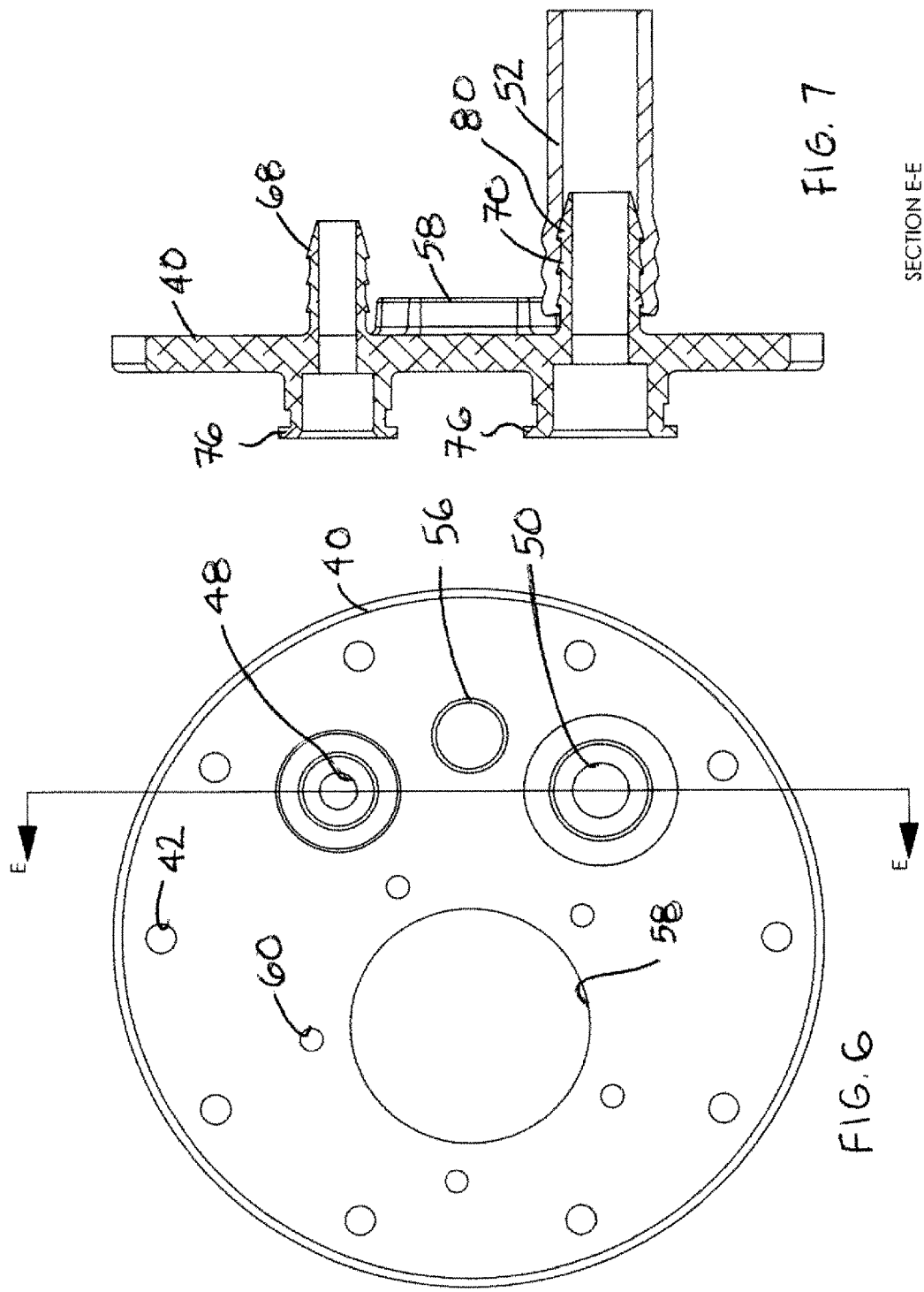

SERVICABLE DRAW AND RETURN TUBE ASSEMBLY

This application claims priority on a US provisional patent application filed on Oct. 24, 2012, and assigned Ser. No. 61/718,006, in the name of inventors Ken Watson, Evan Waymire, and John Loffink.

TECHNICAL FIELD

The present invention relates to a servicable draw and return tube assembly, and a process of manufacturing the same, for use in commercial vehicles, and more particularly, to a removable draw and return tube assembly for use in commercial vehicles wherein the draw and return tubes may be removed from a fuel tank after installation therein.

BACKGROUND OF THE INVENTION

The present invention is particularly intended for use on commercial vehicles, although it may be used with any internal combustion engine connected to a fuel tank having a draw and return tube assembly. In particular, diesel engines typically operate by drawing fuel from a fuel tank, combusting a portion of the fuel and then returning the unused, or uncombusted, fuel to the fuel tank. The volume of fuel returned to the fuel tank is dependent on engine power output, and generally is quite substantial. Accordingly, such draw and return tube assemblies play a vital role in the operation of diesel engines.

Heavy commercial vehicles frequently employ dual fuel tanks, also called saddle tanks, wherein fuel is drawn simultaneously from both tanks for combustion within the engine. To prevent uneven draw and return of the fuel, which may lead to air being drawn into the engine, fuel flow regulators, such as draw and return tube assemblies, typically are installed in each of the dual fuel tanks.

One prior art draw and return tube assembly comprises draw and return tubes fixedly connected to a flange at one end of the tubes. The flange typically is fixedly mounted at an aperture sized to receive the flange on an outside surface of the fuel tank such that the opposite end of each of the draw and return tubes extends downwardly into fuel held within the lower portion of the tank. Draw and return lines from the engine are connected to the draw and return tubes at the flange, outside the tank.

The tube end openings inside the tank and opposite the flange typically extend away from one another and are each positioned an equal distance from the flange so that the draw and return tube fuel openings are also each positioned an equal distance below the top surface of fuel held within the tank. In this arrangement, when the two saddle tanks and the corresponding draw and return tube assemblies are each positioned on the commercial vehicle, the pressure head of fuel positioned above the draw and return tube openings of each assembly will result in equal amounts of fuel being withdraw from each of the tanks and equal amounts of fuel being returned to each of the tanks. In addition, swedging or crimping of the end of the return tube opening opposite the flange will facilitate filling the return fuel line. This filling of the return fuel line enables a siphon effect between the left and right hand fuel tanks. Accordingly, the draw and return tube assemblies of the prior art act as passive flow regulators for ensuring equal levels of fuel drawn and returned to each of the two saddle fuel tanks.

Conventional draw and return tubes are fixedly secured to a flange that is fixedly secured, such as by welding, to the fuel tank. If servicing issues arise with respect to an interior surface of the fuel tank, or with the draw and return tubes themselves, the entire tank may need to be removed and a new tank installed on the truck. This results in expensive and time consuming servicing operations.

Accordingly, there is a need for a draw and return tube assembly that may be serviceable, i.e., removable from a fuel tank, such that an interior of the fuel tank, and the draw and return tubes themselves, may be accessible during servicing of a fuel tank and a draw and return tube assembly after installation thereof.

SUMMARY OF THE INVENTION

The present invention provides a servicable draw and return tube assembly, and a process of manufacturing the same, that overcomes the disadvantages of the prior art. One aspect of the present invention provides a draw and return tube assembly which may be removably secured to a flange, wherein the flange may be fixedly secured to a fuel tank. Removably securing the draw and return tube assembly to the flange may avoid a costly and time consuming welding step, and may allow components of the draw and return tube assembly to be manufactured of a size and with materials that need not withstand a heat intensive welding step. Accordingly, the serviceable draw and return tube assembly may be manufactured at a lower cost than prior art devices and may also allow servicing of the fuel tank and the draw and return tube assembly unit itself, and other components such as a fuel sending unit, after installation thereof.

BRIEF DESCRIPTION OF THE DRAWINGS

FIG. 3 is an end view of a serviceable draw and return tube assembly.

FIG. 4 is a side view of the assembly of FIG. 3.

FIG. 5 is a top view of the assembly of FIG. 3.

FIG. 6 is a top view of a plate of a serviceable draw and return tube assembly.

FIG. 7 is a cross sectional side view of the plate of FIG. 6 taken along line E-E of FIG. 6.

DETAILED DESCRIPTION OF THE PREFERRED EMBODIMENTS

The invention discloses a draw and return tube assembly that is intended for use on commercial vehicles, although it may be used with any internal combustion engine connected to a fuel tank utilizing a draw and return tube assembly.

Figure 1:
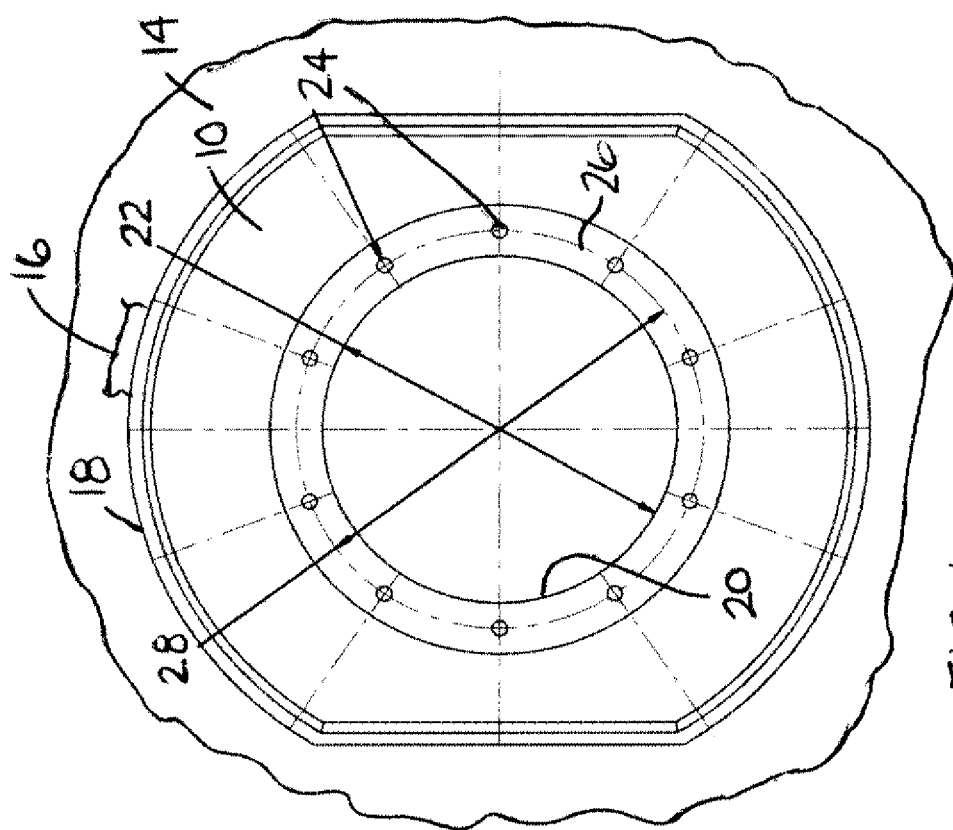
FIG. 1 is a top view of a flange to which a serviceable draw and return tube assembly may be removably secured.

FIG. 1 is a top view of a flange 10 to which a serviceable draw and return tube assembly 12 (FIG. 3) may be removably secured. Flange 10 may be fixedly secured to a fuel tank 14 such as by a weld 16 or other securement structure. This weld step may take place before a serviceable draw and return tube assembly may be secured to flange 10. Weld 16 generally will extend completely around a perimeter 18 of flange 10 so as to define an air tight and a liquid tight seal between tank 14 and flange 10. Only a portion of weld 16 is shown in this view of ease of illustration. In the embodiment shown, flange 10 defines a central aperture 20 that extends completely through flange 10 and defines a diameter 22 of 3.587 inches (in). Positioned around central aperture 20 is an arrangement of securement apertures 24, arranged in a circle 26 that defines a diameter 28 of 4.114 in. Securement apertures may be internally threaded and may be arranged so as to receive fasteners to secure a serviceable draw and return tube assembly 12 (FIG. 3) thereto. In the embodiment shown, flange 10 includes 10 securement apertures 24, but in other embodiments, other arrangements and numbers of securement apertures, or other securement means, may be utilized.

Figure 2:
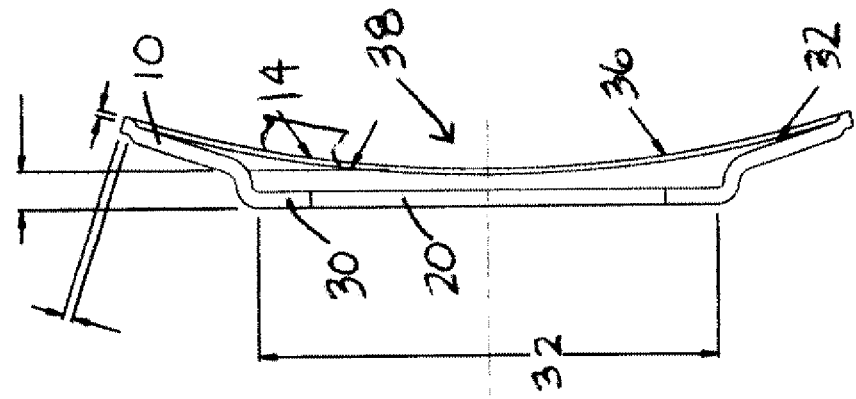
FIG. 2 is a side view of the flange of FIG. 1.

FIG. 2 is a side view of the flange 10 of FIG. 1. In this embodiment flange 10 includes a central, generally flat region 30 which includes central aperture 20 and which defines a diameter 30 of 4.65 in. An outer region 32 of flange 32 defines an angle 34 with respect to flat region 30 of flange 10. In particular, in the embodiment shown, outer region 32 defines a curvature having a radius 36 of 11.02 in, which may mate with an outer surface of fuel tank 14. Fuel tank 14 may include an aperture aligned with central aperture 20 such that a serviceable draw and return tube assembly 12 (FIG. 3) positioned within central aperture 20 will also be placed through an aperture in fuel tank 14 and into and interior 38 of the fuel tank.

FIG. 3 is an end view of a serviceable draw and return tube assembly 12. In this embodiment, assembly 12 includes a flat, circular plate 40 that defines an arrangement of securement apertures 42 that may correspond in placement to securement apertures 24 of flange 10. Fasteners 44, such as threaded screws or bolts may be utilized to secure plate 40 to flange 10. In an embodiment wherein the securement apertures 24 of flange 10 (FIG. 1) are not internally threaded, fasteners 44 may comprise self tapping fasteners or the like. A seal 46, such as a washer shaped cork gasket, only a portion thereof shown for ease of illustration, may be positioned between flange 10 and plate 40 to ensure an air tight and a liquid tight seal there between.

Plate 40 may further include first and second tube apertures 48 and 50 for securement of a draw tube 52 and a return tube 54, respectively, therein. Plate 40 may further include a third aperture 56 extending there through for securement of a vent device therein, and a fourth aperture 58 extending there through for securement of a fuel sending unit therein, for example. Fourth aperture 58 may include an arrangement of five securement apertures 60 extending there around for removable securement of a fuel sending unit thereto. First, second, third and fourth apertures 48, 50, 56 and 58, and securement apertures 60, normally will all be positioned within an interior radial position of plate 40 such that components secured within these apertures will extend through, and not interfere with, central aperture 20 of flange 10 or an aperture in fuel tank 14. In another embodiment a fuel sending unit may be fixedly secured to plate 40 or a fuel sending unit may be manufactured as an integral component of plate 40. In still other embodiments, other apertures or other types of securement structures may be positioned within or on plate 40 for securing other structures, such as one or more auxiliary fuel draw tubes for use with truck mounted auxiliary fuel fired heaters, generators, refrigeration units, and the like.

FIGS. 4 and 5 are a side view and a top view, respectively, of the assembly 12 of FIG. 3. Assembly 12 further includes a stabilizing bracket 62 that may be secured to an underside 64 of plate 40 and which may include two apertures 66 through which draw and return tubes 52 and 54 extend. A stabilizing bracket may be utilized in such a serviceable draw and return tube assembly 12 because, due to the removable connection between plate 40 and flange 10, instead of prior art securement mechanisms such as welding, tubes 52 and 54 may be manufactured with a thinner tube wall thickness than previously utilized. In other words, because tubes 52 and 54 need not withstand the harsh environment of a welding step, thinner walled tubing may be utilized, which may warrant use of stabilizing bracket 62. Due to the removable connection between plate 40 and flange 10, instead of prior art securement mechanisms such as welding, tubes 52 and 54 may be secured to connectors 68 and 70 on plate 40 by an adhesive 72, instead of a welding step, and connectors 68 and 70 may include on a top side 74 of plate 40 a single external lip 76 for connection to fuel hoses by use of a quick disconnect attachment. Moreover, due to the elimination of the welding step of a plate to a flange, molded plastic draw and return tubes 52 and 54 may be utilized, instead of the prior art requirement of rigid metal tubing. In an embodiment wherein tubes 52 and 54 are manufactured of a plastic material, the plastic tubes may be connected to connectors 68 and 70 by integral barbed fittings, or connectors 68 and 70 may themselves be barbed fittings which may allow attachment of tubes 52 and 54 thereto, as well as attachment of fuel hoses thereto on an opposite side of plate 40. In such an embodiment, adhesive may not be utilized to secure the tubes 52 and 54 to the connectors 68 and 70. Similarly, due to the elimination of the welding step of a plate to a flange, a plastic securement device, such as an adhesive or a zip tie 78, may be utilized at a lower end region of draw and return tubes 52 and 54, at which the tubes cross one another, to secure the tubes against movement during operation of the vehicle to which the assembly 12 is installed.

FIG. 6 is a top view of a plate of a serviceable draw and return tube assembly.

FIG. 7 is a cross sectional side view of the plate of FIG. 6 taken along line E-E of FIG. 6. In FIG. 7, connectors 68 and 70 are shown including a barbed fitting to which a plastic tube, such as draw tube 52, may be secured by a simple press or snap fit operation, i.e., the tube is pushed into engagement with barbs 80 of connectors 68 or 70. Plate 40 may be manufactured of a sturdy material such as a metal, including steel or aluminum, for example, or of a rigid plastic or composite material. Use of barbed fittings for connectors 68 and 70 allows for the quick connection of plastic tubes, which are relatively inexpensive to manufacture. Moreover, the quick connect barbed fitting, which allows for a simple press or snap fit of the plastic tubes on the barbs 80, decreases the manufacturing time for fully assembling serviceable draw and return tube assembly 12 Moreover, use of barbs 80 on connectors 68 and 70 may eliminate the need for welding tubes 52 and 54 to plate 40, thereby eliminating the need for providing a thickness of material of plate 40 and connectors 68 and 70 that can withstand the harsh temperatures and environment of a welding operation. Accordingly, plate 40 and connectors 68 and 70 may be manufactured with a relatively thin thickness of material, compared to prior art assemblies, thereby saving material costs in the manufacture of assembly 12. Barbed connectors 68 and 70 also allow for simple changing of tubes 54 and/or 52 during servicing if the need arises.

Still referring to FIG. 7, external lips 76 of connectors 68 and 70 allow for a quick connect press or snap fit of a fuel hose to external lips 76 of connectors 68 and 70, opposite plate 40 from barbed connections 80. Such a press or snap fit external lip design, wherein a hose is connected to external lips 76, may eliminate the need for a thickness of metal at connectors 68 and 70, which may be required in a design when a threaded connection is utilized to secure a fuel hose to plate 40 opposite from barbed connections 80.

In the above description numerous details have been set forth in order to provide a more through understanding of the present invention. It will be obvious, however, to one skilled in the art that the present invention may be practiced using other equivalent designs.

We claim:

1. A fuel tank assembly, comprising:
    a fuel tank including a side wall having an aperture extending there through;
    a flange releasably secured on said fuel tank at said aperture and forming an airtight seal between said flange and said side wall around said aperture; and
    a plurality of fuel flow components releasably secured to said flange and extending into said aperture of said fuel tank;
    wherein said flange includes a flange aperture extending there through, said flange aperture including a plurality of fastener apertures positioned there around, and wherein one of said plurality of fuel flow components is positioned within said flange aperture and extending through said aperture of said fuel tank, said one of said plurality of fuel flow components releasably secured to said flange by fasteners secured within said fastener apertures.

2. The fuel tank assembly of claim 1 wherein said plurality of fuel flow components are chosen from the group consisting of a fuel draw tube, a fuel return tube, a fuel sender unit, an auxiliary fuel draw tube, and a vent device.

3. The fuel tank assembly of claim 1 further comprising a flexible seal positioned between said flange and said fuel tank side wall around said aperture, said flexible seal defining said airtight seal between said flange and said side wall.

4. The fuel tank assembly of claim 1 wherein said flange is secured to said fuel tank by a plurality of threaded fasteners.

5. The fuel tank assembly of claim 1 wherein at least one of said plurality of fuel flow components is releasably secured to said flange with a barbed fitting.

6. The fuel tank assembly of claim 1 wherein said fuel tank and said flange are manufactured of metal and at least one of said plurality of said fuel flow components is manufactured of plastic, said plastic component releasably secured to said flange with a snap fitting.

7. The fuel tank assembly of claim 1 wherein said flange includes a bracket secured thereto, said bracket extending through said aperture of said fuel tank and into an interior of said fuel tank, said bracket supporting at least one of said plurality of said fuel flow components against movement within said fuel tank interior.

8. The fuel tank assembly of claim 1 further comprising a flexible seal positioned between said one of said plurality of fuel flow components and said flange around said flange aperture, said flexible seal defining said airtight seal between said one of said plurality of fuel flow components and said flange.

* * * * *